R. Wright,
Crayon Holder.
No. 80,378.  Patented July 28, 1868.
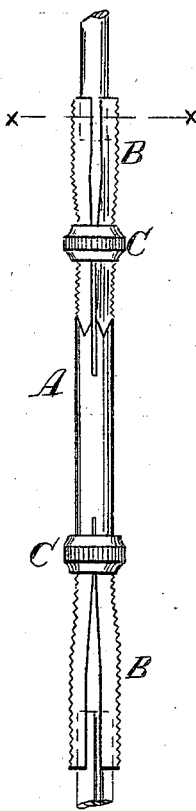
Witnesses
W. C. Ashketter
Wm A. Morgan
Inventor
Rufus Wright
per Munn & Co
Attorneys

United States Patent Office.

RUFUS WRIGHT, OF NEW YORK, N. Y., ASSIGNOR TO HIMSELF AND J. B. CHADWICK, OF NEW HAVEN, CONNECTICUT.

*Letters Patent No. 80,378, dated July 28, 1868.*

IMPROVEMENT IN CRAYON-HOLDERS.

*The Schedule referred to in these Letters Patent and making part of the same.*

TO ALL WHOM IT MAY CONCERN:

Be it known that I, RUFUS WRIGHT, of the city, county, and State of New York, have invented a new and useful Improvement in Crayon-Holders; and I do hereby declare that the following is a full, clear, and exact description thereof, which will enable those skilled in the art to make and use the same, reference being had to the accompanying drawings, forming part of this specification.

This invention relates to improvements in the cases or holders for crayons, which are used in drawing by artists, and in schools and institutions of learning, for demonstrating problems on the blackboard.

These holders are made in the tubular form, with the ends severed for about one-third of the length of the holder from each end, and parted, so as to form springs with which to enclose and hold the crayon.

Slides are placed on the holder, which, as they are moved towards either end, enclose the springs and contract the orifices, so that, when the crayon is placed in the ends, the springs embrace and hold them.

But, in using the holder, these slides are apt to get loose and slide back, thereby loosening the crayon.

The orifices in the ends of the holder (for the crayons) have usually been made round, or nearly so, which form is objectionable on account of the liability of the different-shaped crayons to get loose.

To an artist nothing is more annoying or vexatious than to have his crayon get loose while drawing, and it is for the purpose of providing against such an annoyance that the present improvement is made.

In carrying out my invention, I form the ends of the holder square, so that, when the springs are formed, by splitting the end, they present a right-angled corner each, and I form a screw-thread on two opposite angles of the springs, and screw-threads in the nuts, so that the crayon, when placed in the holder, is pressed at four points, whether it be round or square, and so that it is firmly held by the screw-nut, and all liability to get loose is prevented.

The drawing—

Figure 1, represents a longitudinal view of a crayon-holder constructed according to my invention.

Figure 2 is a cross-section of the same through the line $x\ x$.

Similar letters of reference indicate corresponding parts.

A is the central tubular portion, and

B represents the ends, which are split and parted, so as to form springs, which will open to relieve the crayon when the nuts are turned back.

C represents the nuts, the screw-threads of which engage with the threads on the two opposite corners or angles of the springs, the form of which is seen more distinctly in fig. 2, where a round crayon is represented as being held by the ends of the springs.

The nuts C, as they are turned up towards the ends, compress the springs, as seen in the drawing, and when the crayons are once fastened they are fixed until the nuts are turned back.

This arrangement is equally well adapted to single holders, but crayon-holders are usually made double, so that two colors may be held for the convenience of the artist.

I claim as new, and desire to secure by Letters Patent—

As an improved article of manufacture, a crayon-holder, having its split ends made angular, and provided with screw-threads at opposite angles for the reception of the screw-nuts C, as herein shown and described.

RUFUS WRIGHT.

Witnesses:
J. ALLISON FRASER,
ALEX. F. ROBERTS.